US007987163B2

(12) United States Patent
Keshavarz-Nia et al.

(10) Patent No.: US 7,987,163 B2
(45) Date of Patent: Jul. 26, 2011

(54) APPARATUS AND METHOD FOR DYNAMIC WEB SERVICE DISCOVERY

(75) Inventors: Navid Keshavarz-Nia, Vienna, VA (US); Charles Dickerson, Alexandria, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 439 days.

(21) Appl. No.: 12/030,008

(22) Filed: Feb. 12, 2008

(65) Prior Publication Data

US 2009/0204612 A1 Aug. 13, 2009

(51) Int. Cl.
*G06F 7/00* (2006.01)
(52) U.S. Cl. ............... 707/694; 707/732; 707/733
(58) Field of Classification Search ............... 717/105; 706/47; 707/694, 732, 733
See application file for complete search history.

(56) References Cited

U.S. PATENT DOCUMENTS

| | | |
|---|---|---|
| 5,596,723 A | 1/1997 | Romohr |
| 5,636,216 A | 6/1997 | Fox et al. |
| 5,708,655 A | 1/1998 | Toth et al. |
| 5,812,819 A | 9/1998 | Rodwin et al. |
| 5,835,725 A | 11/1998 | Chiang et al. |
| 5,862,404 A | 1/1999 | Onaga |
| 6,032,151 A | 2/2000 | Arnold et al. |
| 6,085,176 A | 7/2000 | Woolston |
| 6,247,026 B1 | 6/2001 | Waldo et al. |
| 6,263,350 B1 | 7/2001 | Wollrath et al. |
| 6,269,099 B1 | 7/2001 | Borella et al. |
| 6,418,463 B1 | 7/2002 | Blevins |
| 6,466,947 B2 | 10/2002 | Arnold et al. |
| 6,578,044 B1 | 6/2003 | Scheifler et al. |
| 6,601,093 B1 | 7/2003 | Peters |
| 6,604,127 B2 | 8/2003 | Murphy et al. |
| 6,651,046 B1 * | 11/2003 | Sato et al. ............ 706/13 |
| 6,832,223 B1 | 12/2004 | Scheifler et al. |
| 7,114,146 B2 | 9/2006 | Zang et al. |
| 7,181,442 B2 | 2/2007 | Yeh et al. |
| 7,188,155 B2 | 3/2007 | Flurry et al. |
| 2004/0111525 A1 | 6/2004 | Berkland et al. |
| 2005/0027871 A1 | 2/2005 | Bradley et al. |
| 2005/0080768 A1 | 4/2005 | Zhang et al. |
| 2005/0097087 A1 | 5/2005 | Punaganti Venkata et al. |
| 2005/0234873 A1 | 10/2005 | Milligan et al. |

(Continued)

OTHER PUBLICATIONS

Scalable Grid Service Discovery Based on UDDI, S. Banerjee et al, HP Labs http://www.hpl.hp.com/personal/Sung-Ju_Lee/abstracts/papers/mgc2005.pdf.

(Continued)

*Primary Examiner* — Shahid A Alam
*Assistant Examiner* — Donald Lawson
(74) *Attorney, Agent, or Firm* — Rossi, Kimms & McDowell; Marc A. Rossi

(57) ABSTRACT

An apparatus and method is provided to dynamically search for available Web services by persistently searching a distributed multi-level UDDI registry chain, interrogating their published technical specifications and enabling the consumer to find, bind, and invoke the desired Web service in real-time and without intervention by the consumer. The search criteria includes identifying candidate published services that fall within an acceptable margin of error based on information previously published within a consumer service profile. The measure of conformance between the registry semantic map and consumer service profile is parameterized and chosen by the consumer in advance. The service profile includes an XML schema which exposes consumer profile metadata and corresponding information sets used by a rules engine for pattern matching purposes.

14 Claims, 6 Drawing Sheets

U.S. PATENT DOCUMENTS

| | | | |
|---|---|---|---|
| 2006/0265720 A1 | 11/2006 | Cai et al. | |
| 2008/0209392 A1* | 8/2008 | Able et al. | 717/105 |
| 2009/0164424 A1* | 6/2009 | Sznajder et al. | 707/3 |
| 2009/0193485 A1* | 7/2009 | Rieger et al. | 725/114 |
| 2010/0070448 A1* | 3/2010 | Omoigui | 706/47 |

OTHER PUBLICATIONS

UDDI Technical White Paper, UDDI Organization, Sep. 6, 2000 http://www.uddi.org/pubs/lru_UDDI_Technical_White_Paper.pdf.

UDDI Specifications TC version 3.0.2, L.Clement et al, OASIS Spec Technical Committee, Oct. 19, 2004 http://www.oasis-open.org/committees/uddi-spec/doc/spec/v3/uddi-v3.0.2-20041019.htm.

Providing a Taxonomy for UDDI version 2.0, B.McKee et al, OASIS Open Group, Jul. 17, 2001 http://www.oasis-open.org/committees/uddi-spec/doc/tn/uddi-spec-tc-tn-taxonomy-provider-v100-20010717.pdf.

Schema Centric XML Canonicalization Version 1.0, OASIS Open Group, B.Atkinson et al., May 23, 2005 http://www.uddi.org/pubs/SchemaCentricCanonicalization.htm.

Workload Interpretation for Brownian Models of Stochastic Processing Networks, J. Harrison et al, Stanford University, Dec. 4, 2005 http://faculty-gsb.stanford.edu/harrison/Documents/Workload%20Interpretation.pdf.

Web services Dynamic Discovery, J. Beatty et al, Microsoft Corporation, Apr. 22, 2005, http://xml.coverpages.org/WS-Discovery20050422.pdf.

Dynamic Service Discovery and Management in Task Computing, Z.Song et al, Fujitsu Laboratories of America, http://www.flacp.fujitsulabs.com/~rmasuoka/papers/20040824-Task-Computing-MobiQuitous-2004-Paper.pdf.

Managing Dynamic Metadata as Context, M. Aktas et al, Community Grid Lab, Indiana University, http://grids.ucs.indiana.edu/ptliupages/publications/maktas_iccse05.pdf.

XLANG—Web Services for Business Process Design by S.Thatte, Microsoft Corporation http://xml.coverpages.org/XLANG-C-200106.html.

Adaptive Search Algorithm for Patterns, in Succinctly Encoded XML, J. Barbay, David R. Cheriton School of Computer Science, University of Waterloo, Canada, Apr. 21, 2006 http://www.cs.uwaterloo.ca/research/tr/2006/CS-2006-11.pdf.

XRANK: Ranked Keyword Search over XML Documents, L.Guo et al, Department of Computer Science, Cornell Univ. http://www.cs.cornell.edu/people/jai/papers/XRank.pdf.

Correlated Data Inference in Ontology Guided Xml Security Engine, C.Farkas et al., Information Security Laboratory, Department of Computer Science and Engineering, University of South Carolina, Columbia. http://www.cse.sc.edu/~farkas/publications/c9.pdf.

Sequencing XML Data and Query Twigs for Fast Pattern Matching, P.Rao et al., University of Arizona, published in ACM Transaction on Database Systems, vol. 31, No. 1. Mar. 2006 http://www.cs.arizona.edu/~bkmoon/papers/tods-prix.pdf.

p-Queries: Enabling Querying for Semantic Associations on the Semantic Web, K. Anyanwu et al., Department of Computer Science, University of Georgia, May 20, 2003 http://lsdis.cs.uga.edu/lib/download/AS03-WWW.pdf.

Context-Aware Semantic Association Ranking, B.Aleman-Meza et al, Department of Computer Science, University of Georgia, Aug. 21, 2003 http://lsdis.cs.uga.edu/lib/download/AHAS03-SWD-Workshop.pdf.

Modelling Semantic Association and Conceptual Inheritance for Semantic Analysis, P.Vaillant, Humboldt University of Berlin, Chair for Computational Linguistics, Berlin, Germany, Sep. 15, 2001 http://arxiv.org/PS_cache/cs/pdf/0109/0109020.pdf.

Web Ontology Language (OWL) Abstract Syntax and Semantics, P.Patel-Scheinder et al, W3C Working Draft, Feb. 3, 2003 http://www.w3.org/TR/2003/WD-owl-semantics-20030203/.

"Mobile and Dynamic Web Services"—E.Sanchez-Nielsen et al. Presentation at the ECOWS (European Conference on Web Services) in Zurich, Switzerland, Dec. 4-6, 2006.

J. Wang, "Web Service Discovery and Invocation Assistant Service"—Arizona State University Student Project Reports, Dec. 2006; accessed at http://www.poly.asu.edu/technology/dcst/Profects/06-07/index.html, pp. 1-9.

"A View Based Analysis on Web Service Registries"—S. Dustdar et al. published online on Jul. 12, 2005.

\* cited by examiner

APPARATUS AND METHOD FOR DYNAMIC WEB SERVICE DISCOVERY

BACKGROUND

The present invention relates to apparatus and methods for providing available services over an electronic information network. More specifically, the invention relates to apparatus and methods for providing dynamic service discovery and invocation of available services by continuously parsing service registries in a multi-tier network.

The Internet is a world-wide electronic network of interconnected computers that allows for the transmission of information and access to available Web services to any consumer connected to the Internet anywhere in the world. A "consumer" of available Web services, for the purposes of this discussion, may include a human user, an electronic system or a software application that accesses the Internet in order to obtain and utilize the Web services. Web services are only meaningful to a consumer, however, if the availability of the Web services is readily apparent to the consumer at the time the consumer needs to use the Web services.

The behavior and technical interfaces for discovering Web services are well understood in static environments in which the consumer has advance knowledge of the service's technical fingerprint, which is necessary for the successful discovery, binding, and invocation of the Web services. Binding defines how the abstract operations of an interface are actually carried out. The Universal Description Discovery and Integration (UDDI) specifications define a registry service for Web services and for other electronic and non-electronic services. UDDI provides a range of searches such as by service name, businesses, bindings, or by tModels. Although UDDI has many features that makes it appealing for registering Web services, its discovery mechanism has serious limitations. In particular, the UDDI's search function is limited to keyword searches rather than inferences based on taxonomies. These limitations result in high precision and recall errors which are unacceptable in many situations. Also, while UDDI guarantees syntactic interoperability (by using XML to describe its data model), it fails to enable semantic description of its content. Consequently, identical XML descriptions may have different ontological meanings and contextual interpretations. This problem is further aggravated by XML's lack of semantics which creates and additional barrier to UDDI's service discovery.

A UDDI registry service is a Web service that manages information about service providers, service implementations, and service metadata. Service providers can use UDDI to advertise the services they offer. In turn, service consumers can use UDDI to discover services that suit their requirements and to obtain the service metadata needed to consume those services. For example, a consumer can initiate an explicit query against a standard UDDI registry to obtain a desired WSDL document associated with a desired Web service. WSDL is a general purpose XML language for describing the interface, protocol bindings, and the deployment details of network services. Since UDDI and WSDL are co-dependent, WSDL complements the UDDI standard by providing a uniform way of describing the abstract interface and protocol bindings of arbitrary network services. The purpose of the WSDL document is to clarify the relationship between the two and to describe a recommended approach to mapping WSDL descriptions to the UDDI data structures. The WSDL uses concepts of abstract endpoints and messages exchanged between them, and concrete bindings of these into specific protocols and data types. In such a case, the service consumer has an opportunity to explicitly analyze the WSDL document technical contents related to the Web service including service interfaces, protocol bindings, endpoints, and other semantic information before making a conscious decision to initiate a service request.

There are a number of situations, however, in which the service consumer may not have advance knowledge of the desired service's capabilities. Furthermore, even if a search is capable of producing one or more viable services for the service consumer, the ability to dynamically invoke the discovered service without prior knowledge of the technical fingerprint syntax and semantics of the services is extremely limited. Accordingly, it would be desirable to provide an apparatus and method capable of dynamically discovering available Web services and allowing a service consumer to dynamically invoke those Web services, even in cases in which the service's technical fingerprint may not be known to the service consumer at the time the service is needed.

SUMMARY OF THE INVENTION

An apparatus and method is provided to dynamically search for published Web services by continuously searching a multi-level distributed UDDI registry chain, interrogating their published technical specifications and enabling the consumer to find, bind, and invoke the desired Web service in real-time and without intervention by the consumer. The search criteria includes identifying candidate published services that fall within an acceptable margin of error based on information previously published within a consumer service profile. The measure of conformance between the registry semantic map and consumer service profile is parameterized and chosen by the consumer in advance. The service profile includes an XML schema which exposes consumer profile metadata and corresponding information sets used by a rules engine for pattern matching purposes.

The rules engine is a software agent or module which contains complex matching mathematical algorithms based on probability. The matching between the UDDI and WSDL taxonomies are not syntactic, rather based on relationship between the concepts in their web ontology language (OWL) ontologies. The rules engine is either event and or schedule driven API and runs continuously in the background, for example, either on an independent server coupled to the network or as part of the service consumer's own code. In a stochastic process, there is some indeterminacy in its future evolution described by probability distributions. This indicates that even if the initial condition (or starting point) is known, there are many possibilities the process might go to, but some paths are more probable and others less. More importantly, the stochastic process ensures that registry searches are random which minimizes the load on any particular registry node. This is followed by twig pattern analysis using the Prufer method, correlation analysis via the Markov property, analysis of variance and application of the Newman-Keuls method, and XML canonicalization algorithms for each Web service publisherAssertion, businessEntity, busienssServe, bindingTemplate and tModel parameters stored within the UDDI registry.

If a viable match is made, the rules engine further analyzes the exposed WSDL semantic map of the matched service with the consumer service profile signature to compute via probability analysis that an acceptable ontological match exists among the corresponding registry and profile fingerprint data sets. The computed registry probability parameter is compared with the consumer profile tolerance parameters. Only those services that satisfy minimum stipulated threshold levels, which can be preset or mandated as part of the consumer service profile, are memory tagged.

For those services that satisfy a consumer mandated minimum tolerance level, the rules engine generates a service listing which enumerates service name and technical information about service entry point and construction specifications which may include uddi:description, uddi:assessPoint, uddi:hostingRedirector, and other binding and invocation constraints. The service listing also contains a parameter which denoted the probability rating is presented to the consumer for further action. By parsing the WSDL document containing service metadata, the rules engine generates prospective service stubs necessary to permit dynamic Web service invocation by the consumer.

More specifically, in a preferred embodiment, the invention provides a method of dynamically discovering services in a multi-tiered distributed registry system that includes creating a consumer service profile corresponding to at least one selected service utilized by a service consumer, conducting parallel searches via the rules engine within a chain of one or more distributed UDDI registries based on consumer profile matching criteria contained within the consumer service profile; and generating a result set of replacement services that correspond to the selected service utilized by the service consumer. When an interruption of the selected Web service is detected, a replacement Web service which was previously discovered and memory tagged is dynamically implemented from the result set.

In the illustrated embodiment, the service registries provided in the multi-tier network are UDDI registries in which services are published by a service provider. It will be understood, however, that the invention is applicable to any type of network and registry structures.

The rules engine is a software module the preferably resides on a server coupled to the network. In effect, the provision of dynamic invocation in itself can be one service offered to service consumers coupled to the Internet. The rules engine conducts a continuous stochastic search of the service registries and updates the result set, wherein the stochastic search conducted by the rules engine determines whether a service is working or not working. The rules engine further performs a semantic association process to determine similarities between the selected service and services determined to be working. A canonicalization process is then performed by the rules engine to generate a consistent representation of the selected service with respect to services that meet the requirements of the semantic association process, thereby allowing an "apples to apples" comparison between the service defined by the consumer service profile and the services published on the registries. A correlation analysis is then performed on the services subjected to the canonicalization process. The rules engine further performs a twig pattern matching analysis. Twig patterns are simple tree-structured queries for XML that include three basic language elements, namely, arbitrary node conditions, parent-child edges and ancestor-descendant edges. These features make it possible to pose queries with only a limited knowledge of the XML hierarchy, the names of elements and the precise data stored under each element. The rules engine further subjects the results to the correlation analysis, and then performs a variance analysis on the services subjected to the twig pattern analysis. If the results of the variance analysis are statistically significant (i.e., fall within an acceptable probability that Type-I error exists), the rules engine performs a probability rating process on the services subjected to the variance analysis to assign a probability value to the services, wherein the probability value reflects the probability that a particular service is identical in functionality and characteristics to the selected process. The rules engine then performs a threshold analysis to compare the probability ratings assigned by the probability rating process to a predefined threshold, and then performs a prioritization and categorization process on those services having a probability rating that meets the predefined threshold. The rules engine performs a significance assignment process on the services prioritized and categorized by the prioritization and categorization process to assign a significance value to the prioritized services.

The candidate services identified by the rules engine as being identical to the selected service are retained in memory as replacement services. Upon the detection that the selected service is interrupted or inoperable, a replacement service having the highest significance value is automatically invoked to replace the interrupted selected service. Accordingly, the method is capable of dynamically discovering available Web services and allowing a service consumer to dynamically invoke those Web services, even in cases in which the service's technical construct may not be known to the consumer at the time the service is required.

BRIEF DESCRIPTION OF THE DRAWINGS

The invention has been described with reference to certain preferred embodiments and the accompanying drawings, wherein.

DETAILED DESCRIPTION OF THE PREFERRED EMBODIMENTS

Figure 1:
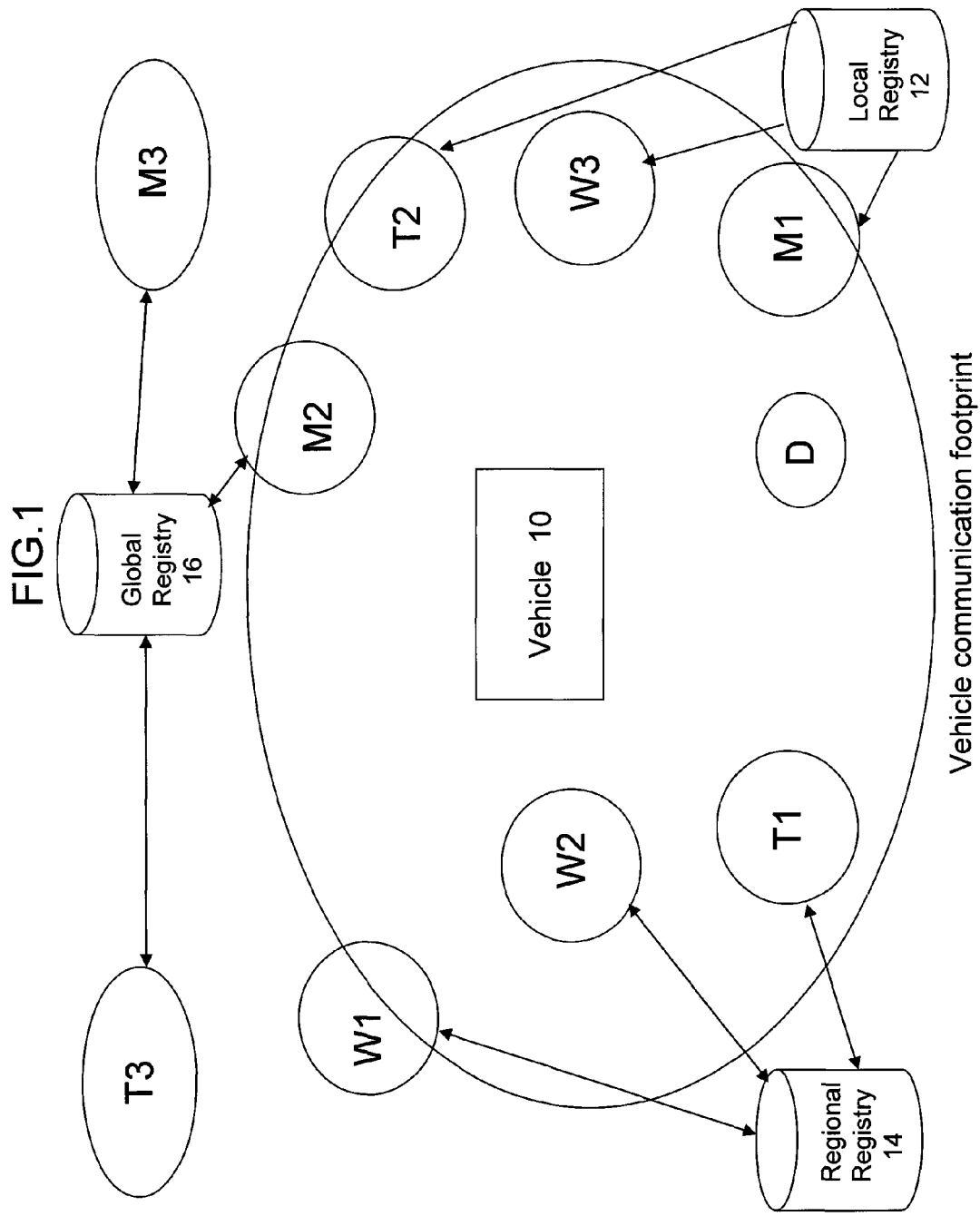
FIG. 1 is a schematic diagram illustrating the implementation of the invention in a multi-tier network system.

An apparatus and method of providing dynamic discovery of available Web services includes the use of a consumer service profile and a rules engine. The consumer service profile contains both metadata and user defined parameters such as service type, description, availability, and other data required to invoke a Web services. These parameters form the basis for the dynamic discovery and invocation of the services. The rules engine is a software module that continuously monitors service performance, searches registry nodes for available services matching parameters defined in the consumer service profile, and provides the service's unique signature back to the consumer for use.

More specifically, a Web service may be published in one more more UDDI registries by a Web service provider for subsequent discovery and invocation by a service consumer. Each provider registered with the UDDI registry categorizes its Web services according to a defined list of service types. For example, a tModel is a UDDI data structure representing a service type (a generic representation of a registered service) in the UDDI registry. The tModel is an abstraction for a technical specification of a service type. It organizes the service type's information and makes it accessible in the registry database. Each tModel consists of a name, service description, and a Universal Unique Identifier (UUID) also called the tModelKey. The tModelKey consists of a series of alphanumeric characters that uniquely identify the service. Accordingly, consumers can search the registry's listed service types to find service providers.

A service consumer also publishes a corresponding consumer service profile that encapsulates metadata about its business requirements, quality of service, functional and performance needs, and other technical and business characteristics. The consumer service profile XML schema codifies the behaviors of specific Web services and the way these behaviors should match to satisfy the overall business process. The consumer service profile, in a preferred embodiment, is published in a dedicated consumer service profile registry coupled to the network and specifically designated for storing consumer profiles. Alternatively, the consumer service profile can be stored in the same local, regional or global registries used to publish available web based services or even on the same server on which the rules engine is implemented.

A consumer service profile XML schema and service instances are continuously monitored by the rules engine to assess their technical, business, or performance behavior characteristics and quality of service contract mandates. The rules engine is a control agent that manages and compares consumer service profile with the tModel descriptions for pattern matching purposes. The comparison is performed in accordance to schema-centric XML canonicalization algorithm. If a comparable service id identified, the rules engine generates a stub which is returned to the consumer. A "stub" is a piece of code that allows the service consumer to invoke the comparable or replacement service.

Due to the continuous changing environment of registry states, the node access is processed stochastically by the rules engine to reduce the likelihood of duplication by the other registry nodes. This process is conditionally independent since it follows the Markov property wherein the probability of future registry state depends only upon current and not on past registry states.

Another UDDI data structure, the bindingTemplate organizes information for specific instances of service types. When service providers desire to make their specification-compliant services available to the registry, they include a reference to the tModelKey for that service type in their bindingTemplate data. The bindingTemplate contains the specific details about an instance of a given interface type, including the location at which a program starts interacting with the Web service. The calling application caches this information and uses it to contact the Web service at the registered address whenever it needs to communicate with the Web service.

If a call fails using cached information previously obtained from a UDDI registry, the rules engine will query the UDDI registry for fresh bindingTemplate information. If the data returned is different from the cached information, the application will retry the invocation using the fresh information. If the result of this retry is successful, the new information will replace the cached information. Cached binding information is kept up to date by means of continuous registry analysis and persistent polling by the rules engine.

By using this pattern with Web services, applications can interact with service consumers without undue communication and coordination costs. By updating the UDDI information with the new address for the Web service, service consumers who use the invocation pattern will automatically locate the new Web service information and recover without further administrative action.

A specific example of a basic application of the invention will be described with reference to FIG. 1. Referring now to FIG. 1, a vehicle 10, is traveling along a prescribed path to reach a destination D. The vehicle 10 is equipped with communication apparatus (not shown) that enables it to communicate with various service providers via the Internet. The available services may include, for example, weather information service providers W1-W3, traffic information service providers T1-T3 and map service providers M1-M3. Each of the services provided by the service providers is registered or published with a UDDI registry, for example either local registry 12, regional registry 14 or global registry 16, which is accessed by the communication apparatus of the vehicle 10 when a desired service is requested.

Figure 2:
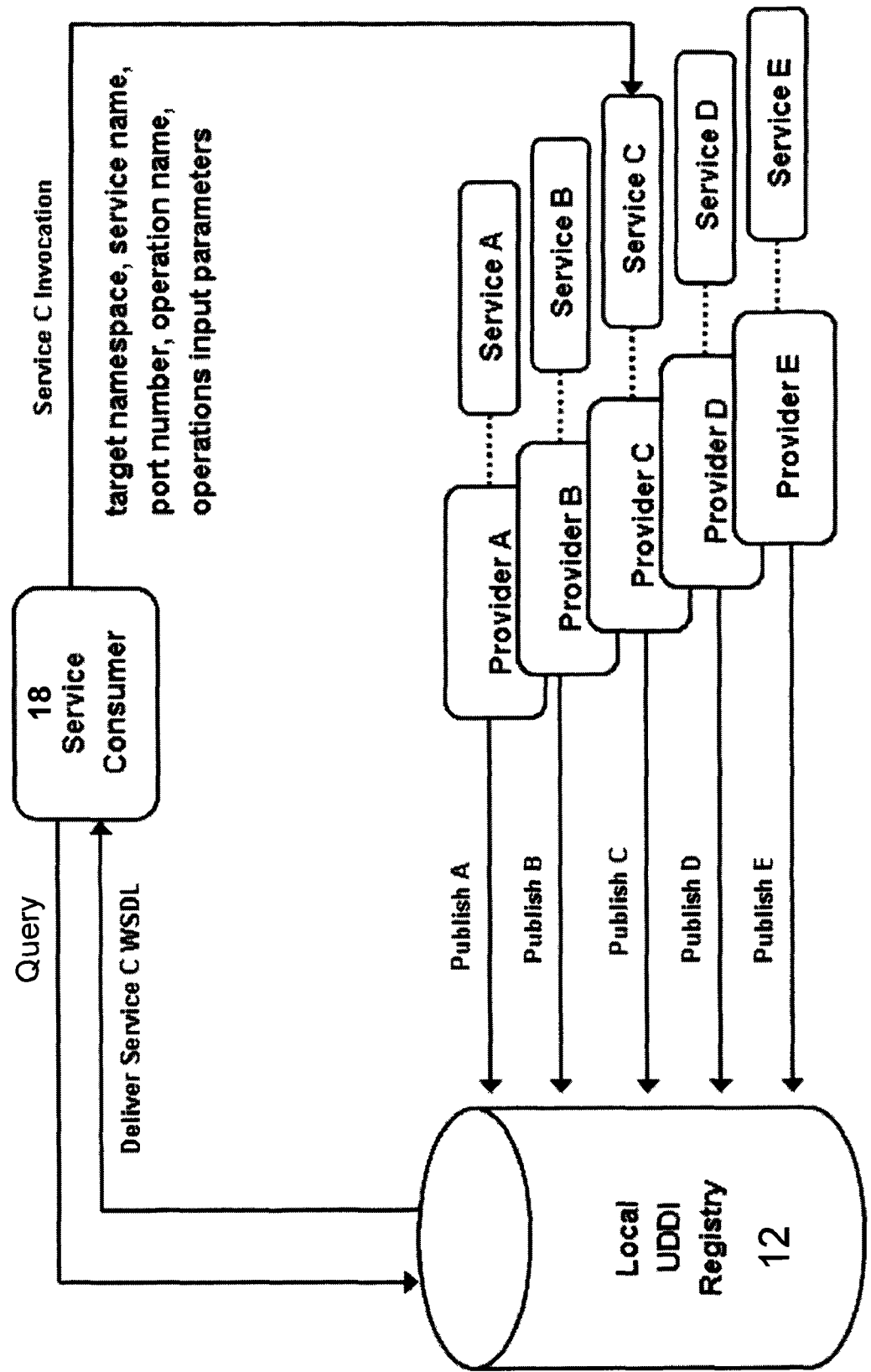
FIG. 2 is a schematic diagram of a single-tier UDDI registry service discovery and invocation example.

An simple example of a single-tier UDDI registry service discovery and invocation is shown in FIG. 2. As illustrated in FIG. 2, service providers A-E publish or register their respective services A-E with a local UDDI registry (for example local registry 12 illustrated in FIG. 1) by providing a WSDL document. A service consumer 18 causes a query to be sent to the local UDDI registry 12 when requesting a particular service. The query sent by the service consumer is matched to a corresponding published service registered with the local UDDI registry (for example Service C provided by Provider C) and the WSDL document of the matched service is provided to the service consumer 18. The WSDL document includes two parts: 1) service interface definition information (message format, port types, protocol bindings); and 2) service implementation definition (service endpoint such as port definition). The service consumer 18 then utilizes the WSDL information obtained from the local UDDI registry 12 to invoke the particular service.

Figure 3:
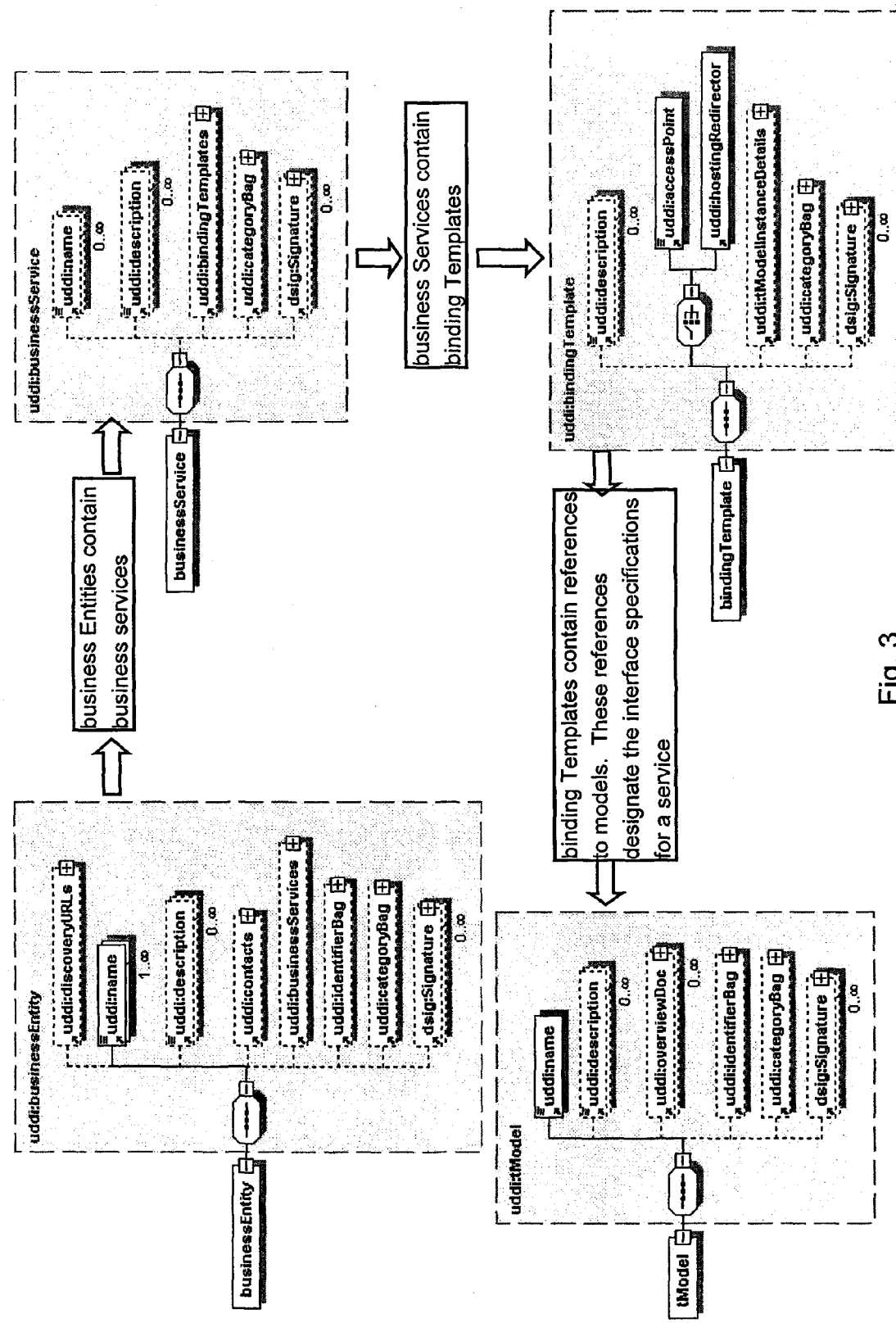
FIG. 3 is a schematic diagram of a UDDI registry structure and relationship module.

FIG. 3 illustrates a conventional UDDI registry structure. Information related to each service provider, the service or services being provided by the service provider, and information on how to bind and invoke the service or services, is stored in the form of a businessEntity record, one or more businessService records that correspond to the business Entity record, one or more bindingTemplate records that correspond to the businessService records and one or more tModel records that correspond to the bindingTemplate records. The businessEntity record includes information about the party who publishes information about the service, namely, the service provider. The businessService record includes descriptive information about a particular family of technical services, for example, mapping services. The bindingTemplate record includes technical information about a service entry point and implementation specifications, namely, how to invoke the service. The tModel record includes descriptions of specifications for services which effectively become the "technical fingerprints" for the service. In other words, the tModel provides the unique identifying information for a particular service as previously described above.

Figure 4:
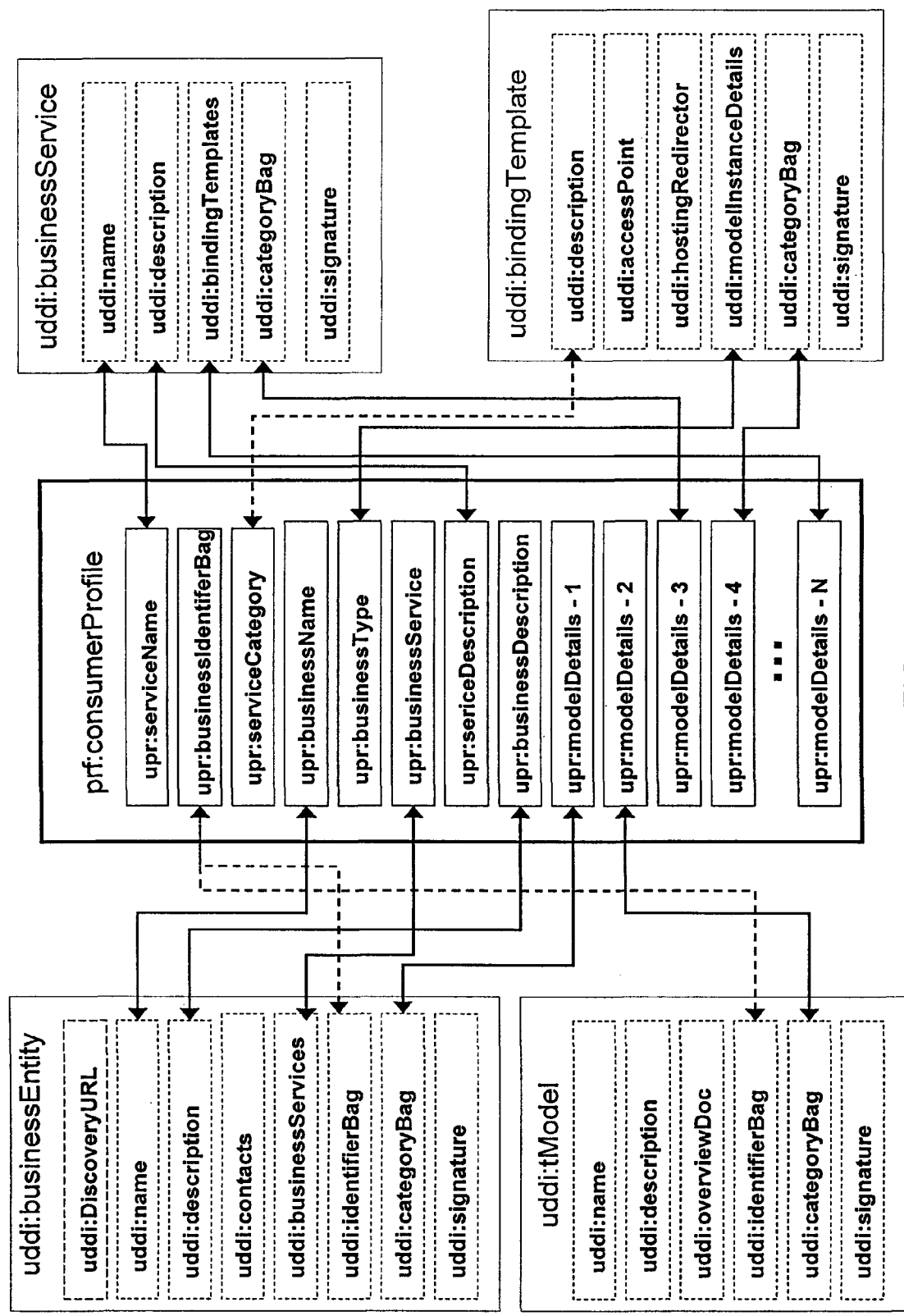
FIG. 4 is a schematic diagram of a consumer profile structure correlated with a UDDI registry.

In addition to the convention information contained in the UDDI registries as represented by FIG. 3, the present invention provides for the generation and storage of one or more consumer profiles that correspond to the service consumer. FIG. 4, for example, illustrates the generation of a consumerProfile record that contains information related to the type of services routinely invoked by the service consumer. The information contained in the consumerProfile record corresponds to the type of information contained in the conventional UDDI registry records.

Figure 5:
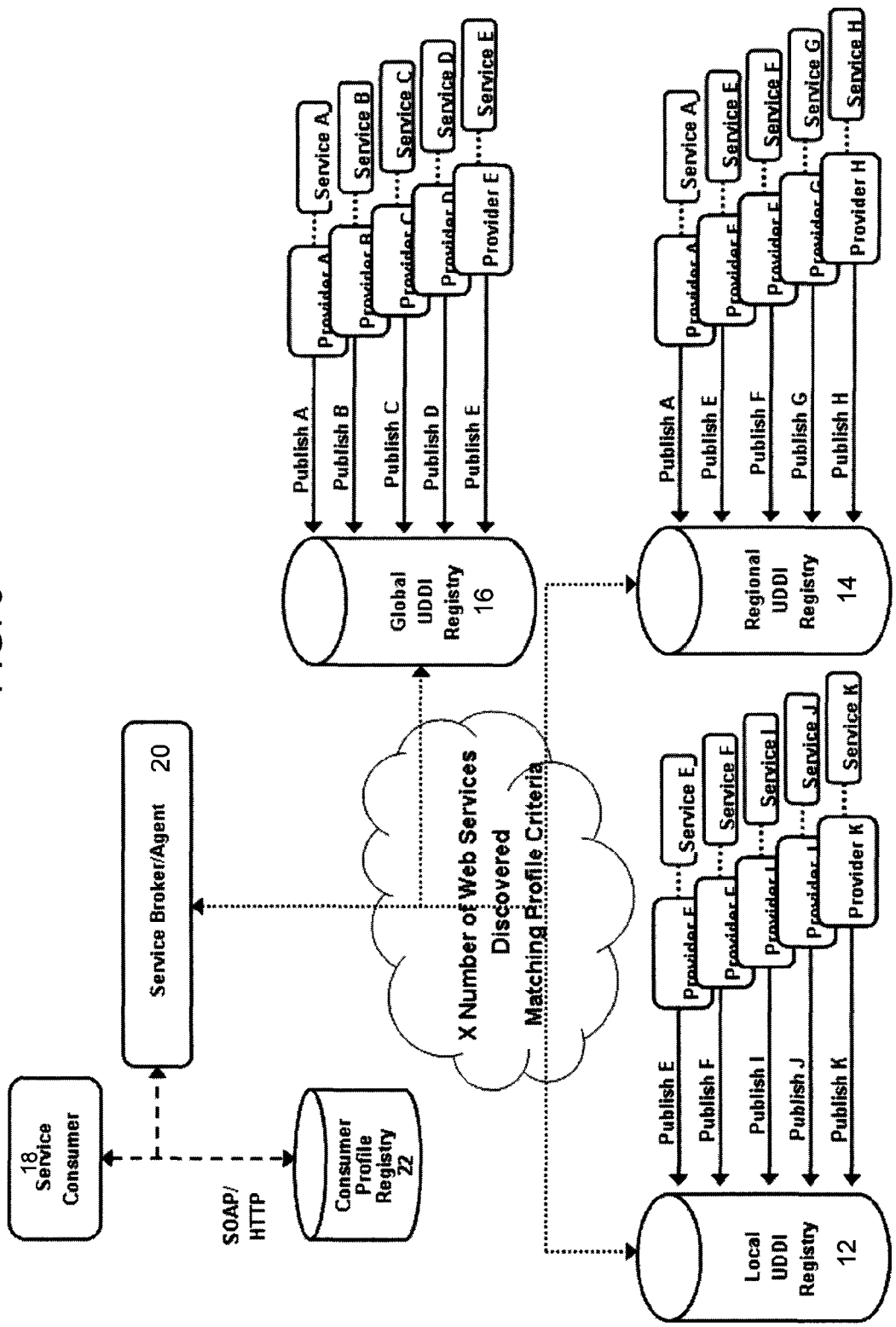
FIG. 5 is a schematic diagram of a hierarchical three-tier service registry in accordance with the invention.

As shown in FIG. 5, a rules engine 20 accesses the consumer profile from a consumer profile registry 22 and matches the consumer profile to registered Web services in accordance with a predetermined matching profile criteria. The rules engine 20 preferably performs a stochastic (random) search of all available registries including, in the illustrated example, local UDDI registry 12, regional UDDI registry 14 and global UDDI registry 16. The rules engine 20 constantly monitors the services being utilized by the service consumer 18. Any services matching the predetermined matching profile criteria are dynamically returned to the service consumer for automatic invocation. Accordingly, should a currently invoked Web service fail for any reason, a comparable or replacement service is automatically and dynamically invoked.

For example, referring back to FIG. 1, a driver of the vehicle 10 equipped with Internet access capability invokes a commercially available mapping service M2 that provides detailed mapping information not available via the vehicle's own navigation system. For example, the commercially available mapping service may provide real images of the area in which the vehicle 10 is located, thereby enabling the driver to more easily orient their position within a geographic region. As the driver is driving within the region, a problem occurs with the invoked mapping service M2 that results in an interruption of the service. For example, the server hosting the mapping service might experience a technical failure. In the case of the present invention, the rules engine 20 has already identified similar mapping services that can replace the lost service. The similar mapping services are automatically and dynamically invoked so that the driver of the vehicle 10 continues to be provided with the desired information without having to manually access another service provider.

The above is a simple example involving a service consumer that includes a human user obtaining information from the Internet. As stated above, however, a service consumer may also include electronic systems or software applications that are automated and access the Internet (or any other type of network that includes a registry structure) in order to obtain services published or registered for use on the network. The vehicle 10 could be any type of vehicle (for example a ship, aircraft or spacecraft) that interacts with a network to obtain services therefrom.

Figure 6:
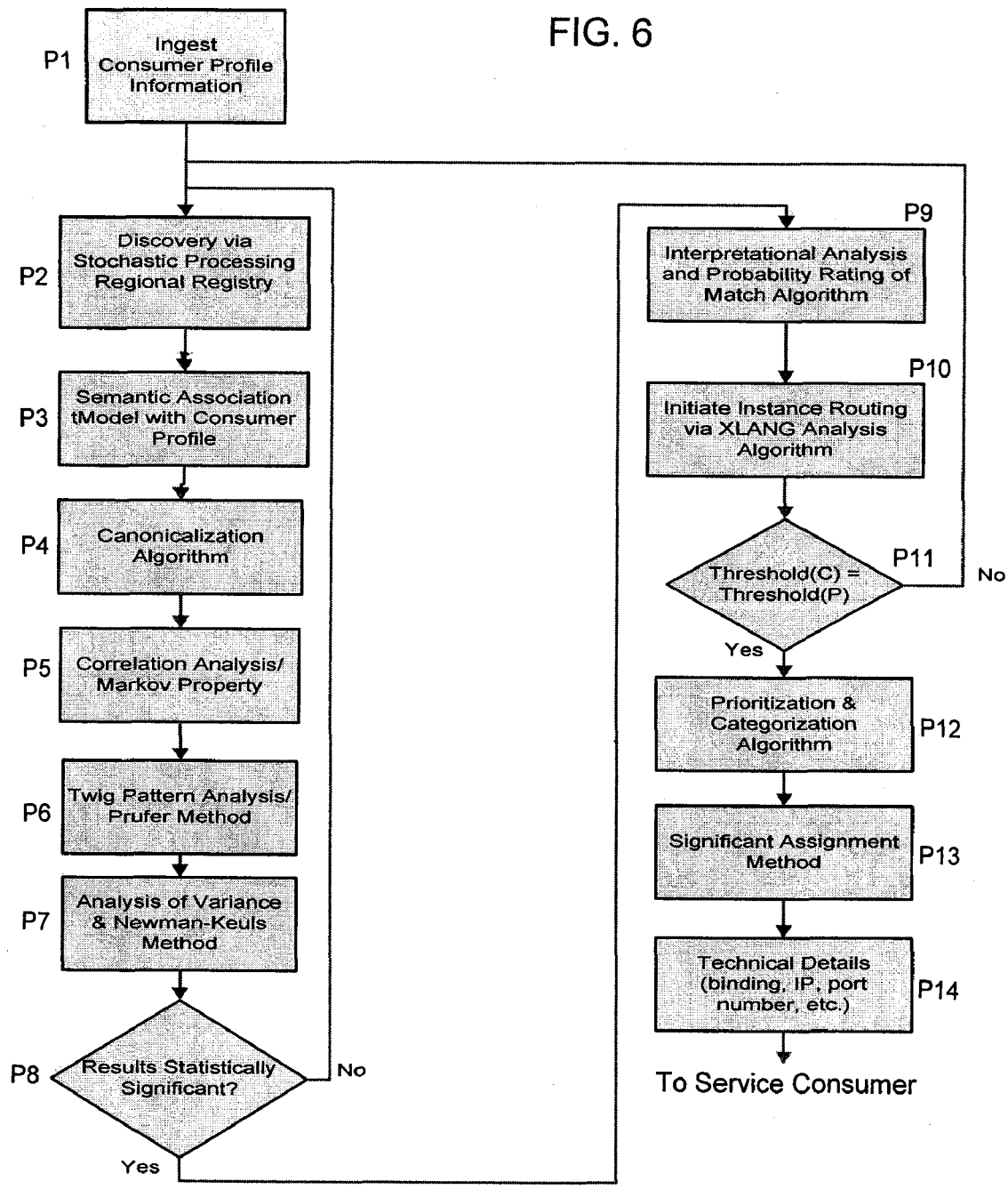
FIG. 6 is a flow diagram illustrating the operation of the rules engine illustrated in FIG. 5.

A preferred analysis process performed by the rules engine 20 is illustrated in FIG. 6. The rules engine 20 first receives the consumer profile information (P1) from the consumer profile registry 22. The rules engine 20 then performs a stochastic search (P2) of all available UDDI registries (local, regional and global) to determine which services are working or available and which services are not working or not available. It is preferable to utilize a stochastic or random search to minimize load placed on the overall network. A semantic association process (P3) is then performed to associate information contained in the consumer profile with information contained in the tModel of available services. Semantic association represents a direct or indirect relationship between two entities. As used here, "semantic" involves those relations that are meaningful to the particular application and can be inferred either based on data itself or with the help of additional knowledge. In the present application, in order to determine if two Web services are semantically equivalent, the relationship and similarities between the metadata associated with the Web services (such as businessEntity, businessService, tModel, etc.) must be assessed.

In some cases, performing the semantic association may be sufficient to generate a probability factor that is acceptable for a given application. For example, if a Web service is identified as having a 98% probability of matching the Web service identified by the consumer profile after performance of the semantic association, and a predetermined threshold probability factor is 97%, then further processing is not necessary and the Web service can be returned to the service consumer for automatic invocation. In other cases, however, it is desirable to return only those services having an extremely high probability of matching the requested services. Accordingly, the preferred process illustrated in FIG. 6 performs a series of processes to insure a greater probability of success.

As illustrated in FIG. 6, a canonicalization algorithm (P4) is run after completion of the semantic association process (P3). Canonicalization is a process for converting data that has more than one possible representation into a "standard" canonical representation. This can be done to compare different representations for equivalence, to count the number of distinct data structures, to improve the efficiency of various algorithms by eliminating repeated calculations, or to make it possible to impose a meaningful sorting order. UDDI registries must exhibit certain behavior with respect to the saved vs. retrieved representations of the entities they handle. Aspects of this behavior require attention to the Schema Centric XML Canonicalization for this function. More specifically, registries must exhibit the following behavior with respect to the data they store and retrieve: let C(d, S) be the Schema Centric XML Canonicalization transform of document d with respect to the set of schemas S, U be the set of UDDI v3 schemas, x and y be UDDI entities, R be a UDDI registry. For all x saved in R, if y is x as retrieved from R, it must be the case that C(x, U)=C(y, U) in a literal bit-by-bit sense.

In other words, if an entity is saved in a UDDI registry and later retrieved, the canonicalization of what was saved will be the same as the canonicalization of what was retrieved. However, this is only guaranteed to be true with respect to the Schema Centric Canonicalization algorithm; in particular such guarantees are not provided with respect to the Canonical XML algorithm or its Exclusive Canonical. Since service discovery engines may use different XML representations of the underlying service structure (such as publisherAssertion, businessEntity, businessService, buildingTemplate, tModel, etc.), the canonicalization process converts the XML into a consistent representation. For example, when checking the contents of the underlying service structure, an XML processor will perform canonicalization process by 1) normalizing line feeds (remove white spaces); 2) normalizing attribute values; 3) replacing CDATA sections with their character content; and 4) resolving character and parsed entity references. Accordingly, the canonicalization process makes sure an "apples to apples" comparison is being made when the tModels are compared.

Next, a correlation process (P5) employing Markov property analysis is performed. In probability theory and statistics, correlation, also called correlation coefficient, indicates the strength and direction of a linear relationship between two random variables. In general statistical usage, correlation or co-relation refers to the departure of two variables from independence. In this broad sense there are several coefficients, measuring the degree of correlation, adapted to the nature of data. Correlation analysis is a mathematical process which compares the linear relationship between random variables generated each from the Web service fingerprints (i.e. tModel). The results determine how closely two services are to each other.

After correlation, a twig pattern analysis (P6) is performed using the Prufer Method. XML documents are modeled as ordered trees. In the XML tree structure, each tree element is assigned a region code (start, end, level) based on its position. Each text is assigned a region code that has the same start and end values. Using the Prufer method, XML queries make use of twig patterns to match relevant portions of data in an XML database. The pattern edges are parent-child or ancestor-descendant relationships.

A variance analysis (P7) using the Newman-Keuls Method is then performed. The key statistic in analysis of variance (ANOVA) is the F-test of difference of group means, testing if the means of the groups formed by values of the independent variable (or combinations of values for multiple independent variables) are different enough not to have occurred by chance. If the group means do not differ significantly then it is inferred that the independent variable(s) did not have an effect on the dependent variable. If the F-test shows that overall the independent variable(s) is (are) related to the dependent variable, then multiple comparison tests of significance are used to explore just which values of the independent(s) have the most to do with the relationship. If the data involve repeated measures of the same variable, as in before-after or matched pairs tests, the F-test is computed differently from the usual between-groups design, but the inference logic is the same. There are also a large variety of other ANOVA designs for special purposes, all with the same general logic.

Newman-Keuls is a statistical method used for multiple comparisons in which the group means are ranked from smallest to largest, and then the statistic that is used to test for a significant difference between a pair of means is computed on the basis of the number of steps between the two means in the rank order. If multiple Web services are discovered in a UDDI registry that have passed the previous tests, the Newman-Keuls process will assign ranking to help determine how close a match exists (e.g., 100%, 99.95%, 80.4%, etc.) as shown, for example, in Table 1.

TABLE 1

| Ranking | Service | Indicator (%) |
|---------|---------|---------------|
| 1 | A12 | 100.00 |
| 2 | B17 | 99.95 |
| 3 | B08 | 80.40 |
| 4 | A09 | 80.01 |
| 5 | D99 | 79.10 |

Based on the above test, service A12 meets 100% and will be selected accordingly.

A determination is then made as to whether the results of the above-processes are statistically significant (P8). In statistics, a result is called statistically significant if it is unlikely to have occurred by chance. "A statistically significant difference" simply means there is statistical evidence that there is a difference; it does not mean the difference is necessarily large, important or significant in the common meaning of the word. Therefore, the statistical significance test compares the highest ranking from Newman-Keuls to assure the results did not occur by pure chance. This test produces same output regardless of how many times the algorithm is run. Hence, the significance level of a test is a traditional frequentist (frequency probability) statistical hypothesis testing concept. It is defined as the probability of making a decision to reject the null hypothesis when the null hypothesis is actually true (a decision known as a Type I error, or "false positive determination"). The decision is often made using the p-value: if the p-value is less than the significance level, then the null hypothesis is rejected. The smaller the p-value, the more significant the result is said to be. This test is used to determine if the service discovered measures indicate statistical significance which provides a high degree of assurance that the results did not occur by pure chance. Statistical significance helps establish repeatability of results.

Next, an interpretation analysis is preferably performed (P9). Specifically, a mathematical algorithm is used to interpret the results of Newman-Keuls and interpreting the results in accordance to specifications within the rules engine. The algorithm also performs semantic comparison of the computed results to assess statistical significance before further action. If the results are not statistically significant, the rules engine returns a SOAP message indicating no operations.

If the results of the analysis are statistically significant, the rules engine performs a probability rating process on the services subjected to the variance analysis to assign a probability value to those services. The probability value reflects the probability that a particular service is identical in functionality and characteristics to the selected process.

Routing analysis is then performed via XLANG analysis algorithm (P10). An XLANG service description extends a WSDL service description with an extension element describing the behavioral aspects of the service. The XLANG process within the rules engine specifies the routing behavior of a Web service. XLANG makes it possible to formally specify business processes as stateful long-running interactions. A Web service with a behavior represents an interaction spanning many operations. XLANG implements message correlation by providing a very general mechanism to specify correlated groups of operations within a Web service instance. A correlation set can be specified as a set of properties shared by all messages in the correlated group.

The rules engine then performs a threshold analysis (P11) to compare the probability value assigned to the services with a predefined threshold which is established by the service consumer in advance. For example, a real-time Web service should only be invoked if the above tests satisfy a threshold of 100. Interpretation analysis is intended to give control to the service consumer to determine what minimum threshold or tolerance level should be satisfied before a Web service is fired off.

The rules engine then performs a prioritization and categorization process whereby services which are discovered and satisfy the tests above are prioritized according to how closely the consumer's service needs are met (P12).

Finally, a significance assignment process is then applied (P13). The significance assignment process is another measure of statistical significance after probability rating and threshold analyses are satisfied. This algorithm places a numerical value which is generated and illustrates how closely the discovered service is based on the probability that it matches the original Web service.

The above processes are utilized to define a replacement set of services that can be dynamically invoked in a number of ways when a selected service currently being utilized be a service consumer fails. For example, the rules engine compiles the bindingTemplate, tModelInstanceInfo, instanceDetails and other technical details and creates a WSDL document for each of the replacement services (P14). The WSDL documents are then transmitted to the service consumer and maintained in a replacement set table. Upon failure of the selected service, the service consumer then automatically selects a replacement service from the replacement set table. Alternatively, the replacement set table may be maintained at the rules engine, such that the rules engine automatically supplies a replacement service WSDL document in response to a query from the service consumer. Still further, the replacement set table can be cached at any location on the network readily available to the service consumer.

It should further be noted that the detection of the failure of the selected service can be performed in a number of different ways. For example, the service consumer itself may detect failure and then automatically and dynamically invoke a replacement service. However, since the rules engine is preferably constantly running in the background and making a determination of which services are functioning and which services are not functioning, the rules engine may detect a failure of the selected service and automatically and dynamically invoke a replacement service for the service consumer. Still further, combinations of both methods, and others, may also be employed based on the type of failure of the selected service. For example, the selected service may fail due to the service consumer traveling outside of a boundary to which the selected service is provided. In such case, the selected service may still be functional, but simply not available to the service consumer. Accordingly, the service consumer may dynamically invoke a replacement service. Alternatively, the selected service may fail due to an equipment failure, in which case the failure of the selected service may be detected by the rules engine. In this case, the rules engine may dynamically invoke a replacement service even before the service consumer is aware of the failure.

The invention has been described with reference to certain preferred embodiments thereof. It will be understood that modifications and variations are possible within the scope of the appended claims. As previously noted, the rules engine can be implemented at a number of locations including, for example, an independent server coupled to the network, as part of the service consumer's own server or system, or at any registry. Although the preferred method of implementation of the rules engine would be as a software module running on a general purpose processor, it could also be implemented using application specific processors, firmware, hardware or combinations of all of the above. Further, one or more of the processes illustrated in FIG. 6 are preferably implemented as subroutines or software modules within the rules engine, each software module corresponding to the means that allows the rules engine to perform the specified function, but not every application will require each of the specified processes.

What is claimed is:

1. A method of dynamically discovering services in a multi-tiered distributed registry system comprising:

conducting a search with a rules engine within a chain of one or more service registries based on consumer profile matching criteria contained within a consumer service profile;

generating a result set of replacement services that correspond to a selected service utilized by a service consumer corresponding to the consumer service profile; and detecting an interruption of the selected service and dynamically selecting a replacement service from the result set to be provided to the service consumer;

wherein the rules engine conducts a stochastic search of the service registries;

wherein the stochastic search conducted by the rules engine determines whether a service is working or not working;

wherein the rules engine further performs a semantic association process to determine similarities between the selected service and services determined to be working;

wherein the rules engine further performs a canonicalization process to generate a consistent representation of the selected service with respect to services that meet the requirements of the semantic association process;

wherein the rules engine further performs a correlation analysis on services subjected to the canonicalization process;

wherein the rules engine further performs a twig pattern analysis on the services subjected to the correlation analysis;

wherein the rules engine performs a variance analysis on the services subjected to the twig pattern analysis; and wherein the rules engine, if the results of the variance analysis are statistically significant, performs a probability rating process on the services subjected to the variance analysis to assign a probability value to the services, wherein the probability value reflects the probability that a particular service is identical in functionality and characteristics to the selected process.

2. The method as claimed in claim 1, wherein the service registries are UDDI registries in which services are published by a service provider.

3. The method as claimed in claim 1, wherein the rules engine continuously searches the service registries and updates the result set.

4. The method as claimed in claim 1, wherein the rules engine performs a threshold analysis to compare the probability ratings assigned by the probability rating process to a predefined threshold.

5. The method as claimed in claim 4, wherein the predefined threshold is contained within the consumer service profile.

6. The method as claimed in claim 4, wherein the rules engine performs a prioritization and categorization process on those services having a probability rating that meets the predefined threshold.

7. The method as claimed in claim 6, wherein the rules engine performs a significant assignment process on the services prioritized and categorized by the prioritization and categorization process.

8. An apparatus of dynamically discovering services in a multi-tiered distributed registry system comprising:

at least one service registry storage device;

a rules engine processing device that conducts a search within the service registry storage device for replacement services based on consumer profile matching criteria contained within a consumer service profile and generates a result set of replacement services that correspond to a selected service utilized by a service consumer that corresponds to the consumer service profile; and means for detecting an interruption of the selected service and dynamically selecting a replacement service from the result set to be provided to the service consumer;

wherein the rules engine conducts a stochastic search of the service registries;

wherein the stochastic search conducted by the rules engine determines whether a service is working or not working;

wherein the rules engine further performs a semantic association process to determine similarities between the selected service and services determined to be working;

wherein the rules engine further performs a canonicalization process to generate a consistent representation of the selected service with respect to services that meet the requirements of the semantic association process;

wherein the rules engine further performs a correlation analysis on services subjected to the canonicalization process;

wherein the rules engine further performs a twig pattern analysis on the services subjected to the correlation analysis;

wherein the rules engine performs a variance analysis on the services subjected to the twig pattern analysis; and wherein the rules engine, if the results of the variance analysis are statistically significant, performs a probability rating process on the services subjected to the variance analysis to assign a probability value to the services, wherein the probability value reflects the probability that a particular service is identical in functionality and characteristics to the selected process.

9. An apparatus as claimed in claim 8, wherein the service registries are UDDI registries in which services are published by a service provider.

10. An apparatus as claimed in claim 8, wherein the rules engine continuously searches the service registries and updates the result set.

11. An apparatus as claimed in claim 8, wherein the rules engine performs a threshold analysis to compare the probability ratings assigned by the probability rating process to a predefined threshold.

12. An apparatus as claimed in claim 11, wherein the rules engine performs a prioritization and categorization process on those services having a probability rating that meets the predefined threshold.

13. An apparatus as claimed in claim 12, wherein the rules engine performs a significant assignment process on the services prioritized and categorized by the prioritization and categorization process.

14. An apparatus as claimed in claim 11, wherein the predefined threshold utilized by the rules engine is contained within the consumer service profile.

* * * * *